(12) United States Patent
Cheah et al.

(10) Patent No.: US 10,477,386 B1
(45) Date of Patent: Nov. 12, 2019

(54) AUTOMATIC STUN KILL IN A PEER TO PEER TWO-WAY RADIO NETWORK

(71) Applicant: MOTOROLA SOLUTIONS, INC., Chicago, IL (US)

(72) Inventors: Chow Chin Cheah, Penang (MY); Princy Kooran Paul, Penang (MY); Johnny Lian Sen Law, Sarawak (MY); Yunhai Yang, Elgin, IL (US); Wai Chun Liew, Perak (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/031,808

(22) Filed: Jul. 10, 2018

(51) Int. Cl.
| | |
|---|---|
| *H04M 3/00* | (2006.01) |
| *H04W 8/22* | (2009.01) |
| *H04W 4/08* | (2009.01) |
| *H04W 4/029* | (2018.01) |
| *H04W 4/02* | (2018.01) |

(52) U.S. Cl.
CPC .............. *H04W 8/22* (2013.01); *H04W 4/027* (2013.01); *H04W 4/029* (2018.02); *H04W 4/08* (2013.01)

(58) Field of Classification Search
CPC ....... H04W 4/80; H04W 24/10; H04W 88/02; H04W 4/025; H04W 4/027
See application file for complete search history.

(56) References Cited

U.S. PATENT DOCUMENTS

| | | | |
|---|---|---|---|
| 2015/0229662 A1* | 8/2015 | Hitt | H04L 63/1425 726/23 |
| 2016/0135046 A1* | 5/2016 | John Archibald | H04W 12/06 455/411 |
| 2016/0277439 A1* | 9/2016 | Rotter | H04L 63/0861 |

* cited by examiner

*Primary Examiner* — Khalid W Shaheed
(74) *Attorney, Agent, or Firm* — Michael Best & Friedrich LLP (57) ABSTRACT

A method and device for disabling a communication device of a communication network that includes a second communication device. The communication device includes an electronic processor configured to perform an examination of a behavior of the communication device, determine, based on a result of the examination of a behavior of the communication device, a score of the communication device, and disable, in response to the score exceeding a predetermined threshold, the communication device.

18 Claims, 6 Drawing Sheets

AUTOMATIC STUN KILL IN A PEER TO PEER TWO-WAY RADIO NETWORK

BACKGROUND OF THE INVENTION

Public safety personnel (for example, first responders, investigators, and the like) may be equipped with portable radios (subscriber units) to communicate with each other at an active incident scene (for example, a building fire, a robbery, a natural disaster, or other public safety event). Such communications may include sensitive information that should not be shared with outside personnel.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel may communicate with other public safety personnel at and/or on the way to an active incident scene via radio. Such communications may include sensitive information that should not be shared with outside personnel, especially perpetrators involved in the incident. However, it is possible for a subscriber unit to be hijacked or stolen during the incident. The perpetrator may use the radio to monitor communication between public safety personnel. In such a scenario, it may be difficult for public safety personnel within the group to realize that the radio has been seized. In addition, in some cases the radios may not be in contact with a central server to act as the network controller (for example, contact with the central server may be disabled during a particular emergency situation). Thus, there is a need for a dynamic automatic detection of a stolen/compromised radio.

Some communication devices (for example, two-way radios) include one or more functions to be used in situations when the device is lost or stolen. These functions include "stun" and "kill" functions. A "stun" signal may be transmitted to the lost or stolen device from another communication device (for example, a second radio). The lost or stolen radio, in response to receiving the stun signal, may enter a "stunned" mode, wherein one or more features of the radio are temporarily disabled (for example, the radio becomes unable transmit and receive any messages). The lost or stolen radio may eventually restore its communication functionality upon receiving a "revive" signal from another communication device. Similarly, a "kill" signal may be transmitted to the lost or stolen radio and the radio, in response to the kill signal, permanently disables all of its functions, only able to be reactivated after re-programming.

Accordingly, systems and methods are provided herein for, among other things, an automatic communication device-disablement process for a possibly stolen communication device.

One example embodiment provides a communication device for use with a communication network that includes a second communication device. The communication device includes an electronic processor configured to perform an examination of a behavior of the communication device, determine, based on a result of the examination of a behavior of the communication device, a score of the communication device, and disable, in response to the score exceeding a predetermined threshold, the communication device.

Another example embodiment provides a method for disabling a communication device of a communication network. The method includes performing an examination of a behavior of the communication device, determining, based on a result of the examination of a behavior, a score of the communication device, and disabling, in response to the score exceeding a predetermined threshold, the communication device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
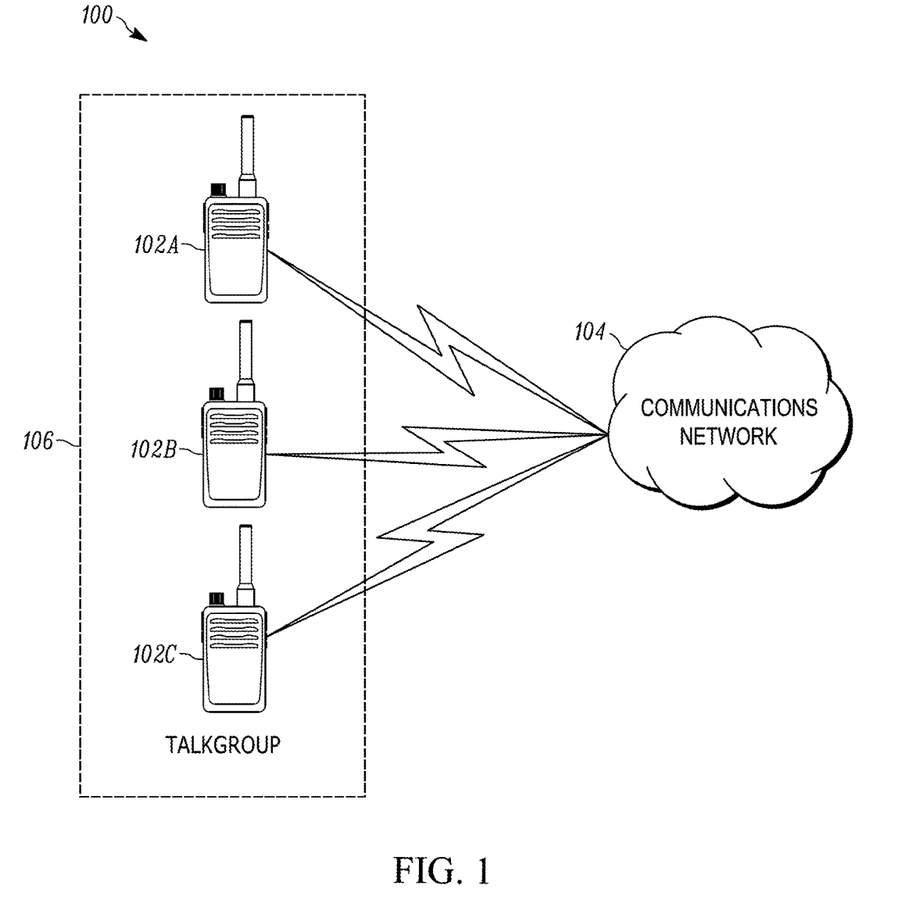
FIG. 1 is a diagram of a communication system, in accordance with some embodiments.

FIG. 1 illustrates an example radio communication system 100. The communication system 100 includes a plurality of subscriber units 102A, 102B, and 102C (collectively referred to as subscriber units 102). The subscriber units 102 are each an electronic communication device (for example, a portable two-way radio or a converged device (a device capable of communicating using two or more distinct communication protocols)) communicatively coupled to each other via a communication network 104. The communication network 104 may include a land mobile radio (LMR)

network, a terrestrial trunked radio (TETRA) network, or a digital mobile radio (DMR) network. The communication network 110 may also include a wide area network (WAN) (for example, a transport control protocol/internet protocol (TCP/IP) based network, a cellular network, such as, for example, a Global System for Mobile Communications (or Groupe Special Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3G network, a 4G network, a 5G network, a device-to-device network, and combinations or derivatives thereof.

The communication network 104 operates in either a conventional or trunked configuration. In either configuration, the subscriber units 102 are partitioned into separate groups (called talkgroups) of communication devices. For example, in the embodiment illustrated in FIG. 1, the subscriber units 102 are part of a talkgroup 106. In a conventional narrowband system, each subscriber unit in a group is selected to a particular radio channel (frequency or frequency and time slot) for communications associated with that subscriber unit's group. Thus, each group is served by one channel, and multiple groups may share the same single frequency (in which case, in some embodiments, group IDs may be present in the group data to distinguish between groups using the same shared frequency).

In contrast, a trunked radio system and its subscriber units use a pool of traffic channels for virtually an unlimited number of groups of subscriber units. Thus, all groups are served by all channels. A trunked radio system works to take advantage of the probability that not all groups need a traffic channel for communication at the same time. With a given number of channels, a much greater number of groups may be accommodated in a trunked radio system as compared with a conventional radio system.

The subscriber units 102 may be capable of concurrent voice and data transmission and reception. While operating to transmit users' voice calls, the subscriber units 102 encode and transmit telemetry data, also referred to herein as over-the-air data. Some methods for the concurrent transmission of voice and data are known, for example, the hardware and software illustrated and described in U.S. Pat. No. 9,232,376 B2 ("CONCURRENT VOICE AND DATA SERVICE ON A SAME DIGITAL RADIO CHANNEL"), issued Jan. 5, 2016.

While FIG. 1 illustrates three subscriber units 102 in the talkgroup 106, it should be understood that embodiments of the methods described herein may be used to exchange data from more subscriber units than illustrated. In some embodiments, portions of the methods described herein may be performed by one or more subscriber units outside the talkgroup 106.

Figure 2:
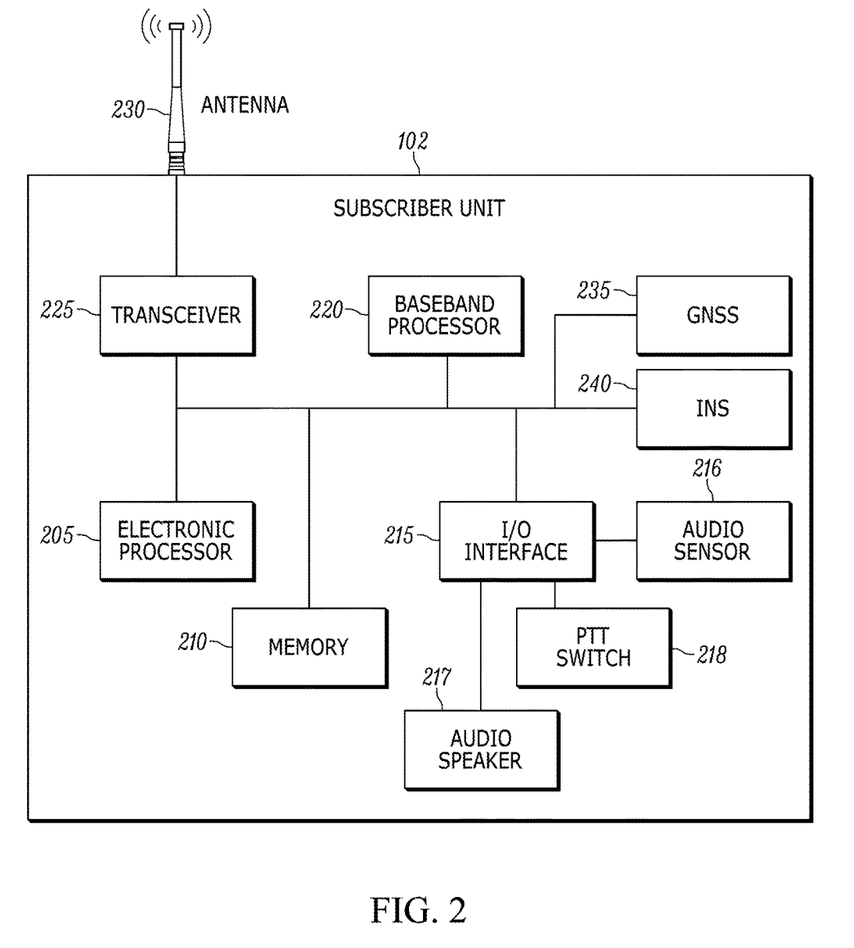
FIG. 2 schematically illustrates a subscriber unit included in the communication system of FIG. 1 according to some embodiments.

FIG. 2 is a block diagram of a subscriber unit 102. The subscriber unit 102 includes an electronic processor 205, a memory 210, an input/output interface 215, an audio sensor 216, an audio speaker 217, a push-to-talk (PTT) switch 218, a baseband processor 220, a transceiver 225, and an antenna 230. In some embodiments, the subscriber unit 102 also includes a global navigation satellite system 235 and/or an inertial navigation system 240. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein.

In some embodiments, the subscriber unit 102 is configured to perform machine learning functions. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data, and progressively refine algorithms for data analytics.

The input/output interface 215 is configured to receive input and to provide system output. The input/output interface 215 obtains information and signals from, and provides information and signals to, (for example, over one or more wired and/or wireless connections) devices both internal and external to the subscriber unit 102. Output may be provided via the audio speaker 217. In some embodiments, output may be provided via a display (not shown). The audio speaker 217 is a transducer for reproducing sound from electrical signals (for example, generated from a received audio stream) received from the electronic processor 205. The display may be a suitable display, for example, a liquid crystal display (LCD) touch screen, or an organic light-emitting diode (OLED) touch screen. Alternative embodiments may include other output mechanisms such as, for example, haptic feedback motors and light sources (not shown). Input may be provided via the audio sensor 216. The audio sensor 216 is configured to capture audio. The audio sensor 216 may be, for example, a microphone. Input may also be provided, for example, via a keypad, soft keys, icons, or soft buttons on the display, a scroll ball, buttons, and the like. The input/output interface 215 may include a graphical user interface (GUI) (for example, generated by the electronic processor 205, from instructions and data stored in the memory 210, and presented on the display) that enables a user to interact with the subscriber unit 102.

The electronic processor 205 is configured to control the baseband processor 220 and the transceiver 225 to transmit and receive audio, video, and other data to and from the subscriber unit 102. The baseband processor 220 encodes and decodes digital data sent and received by the transceiver 225. The transceiver 225 transmits and receives radio signals to and from, for example, the communication network 110 using the antenna 230. The electronic processor 205, the baseband processor 220, and the transceiver 225 may include various digital and analog components, which for brevity are not described herein and which may be implemented in hardware, software, or a combination of both. Some embodiments include separate transmitting and receiving components, for example, a transmitter and a receiver, instead of a combined transceiver 225.

The subscriber unit 102 is capable of push-to-talk audio communication. Push-to-talk is a method of transmitting audio communications over a half-duplex communication channel. Push-to-talk communication may be between one individual and another individual or between one individual and a group of individuals (for example, via a talk group). A user of the subscriber unit 102 controls push-to-talk communication using the push-to-talk switch 218. In the example illustrated, the push-to-talk switch 218 is an electromechanical switch (for example, a normally-open momentary switch). The push-to-talk switch 218 includes a spring or other mechanical means of keeping the switch in an open position until pressed (for example, a metal snap dome), and returning it to an open position when it is released. The push-to-talk switch 218, when pressed, causes transmission of an audio communication (for example, a produced audio signal based on audio captured by the audio sensor 216) from the subscriber unit 102 via the electronic processor 205 and the transceiver 225. When the push-to-talk switch 218 is released, the transceiver 225 is placed into a reception mode, for example, to receive a response to the audio communication. When the subscriber unit 102 receives communications, the electronic processor 205 receives radiofrequency signals via the transceiver 225, and processes the signals to extract a digital received audio signal. The digital received audio signal is provided to the audio speaker 217. In some instances, a virtual push-to-talk button (for example, an element of a graphical user interface presented on a touch screen) may be used.

The global navigation satellite system (GNSS) 235 receives radiofrequency signals from orbiting satellites using one or more antennas and receivers (not shown). The global navigation satellite system 235 determines geo-spatial positioning (that is, latitude, longitude, altitude, and speed) for the subscriber unit 102 based on the received radiofrequency signals. Global navigation satellite systems are known, and will not be described in greater detail. In some embodiments, the global navigation satellite system 235 operates using the global positioning system (GPS). Alternative embodiments may use a regional satellite navigation system, and/or a land-based navigation system in conjunction with, or in place of, the global navigation satellite system 235.

The inertial navigation system (INS) 240 uses sensors to continuously calculate by dead reckoning the position, the orientation, and the velocity (that is, the direction and speed of movement) of the subscriber unit 102. The sensors include motion sensors (for example, a three-axis accelerometer), rotation sensors (for example, one and two axis gyroscopes), magnetic sensors (for example, three-axis magnetometers), or combinations of the forgoing. In some embodiments, one or more of the sensors of the inertial navigation system 240 include micro-electrical-mechanical system (MEMS) technology.

The global navigation satellite system 235 and the inertial navigation system 240 communicate their respective positioning information to the electronic processor 205. The electronic processor 205 uses the information to continuously determine the position of the subscriber unit 102. The electronic processor 205 uses the information provided by the inertial navigation system 240 to determine the position when external signals are unavailable to the global navigation satellite system 235.

As noted above, emergency personnel involved in an active incident scene may not realize when a subscriber unit has been compromised or stolen by non-emergency personnel. As a consequence, there is a need for determining and disabling a stolen subscriber unit.

Figure 3:
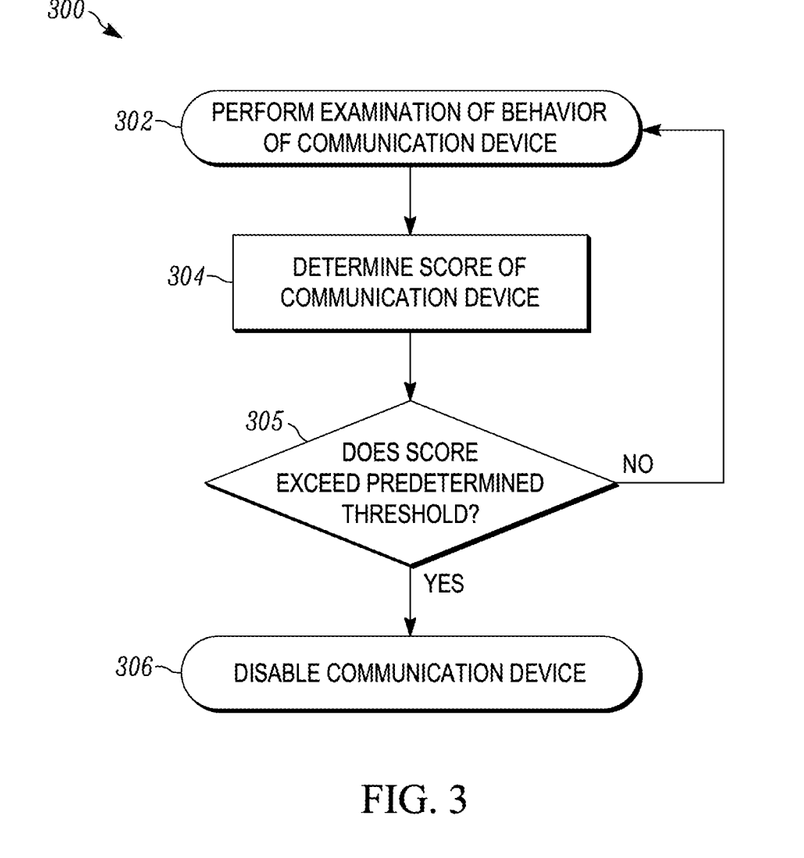
FIG. 3 is a flowchart of a method for disabling a subscriber unit within the system of FIG. 1 in accordance with some embodiments.

FIG. 3 illustrates a method 300 for determining and disabling a subscriber unit 102. The method 300 (as well as methods 400, 500, and 600 described below) is described as being performed by the subscriber unit 102A and, in particular, the electronic processor 205. However, it should be understood that in some embodiments, portions of the method 300 may be performed by other devices, including, for example, another subscriber unit 102B and/or 102C of the talkgroup 106. In some embodiments, the method 300 may be initiated when the subscriber unit(s) 102 are within a predetermined proximity to an active incident scene. Also, it should be noted that the methods described herein are performed on one or more of the subscriber units 102 and any accessory devices coupled to them as opposed to being performed by a central server/central radio network controller.

At block 302, the electronic processor 205 performs an examination of a behavior of the subscriber unit 102A. The examination of a behavior may include a self-examination, a group-examination, or both. A self-examination is an analysis performed solely by the subscriber unit 102 while a group-examination is an analysis/test performed across one or more of the other subscriber units of the talkgroup 106. As described in more detail below in regard to FIGS. 4, 5, and 6, the electronic processor 205 may perform several kinds of examinations. At block 304, the electronic processor 205 determines, based on a result of the examination, a score of the subscriber unit 102. The score indicates how abnormal or suspicious the behavior/operation of the subscriber unit 102 is (more specifically, a user's operation of the subscriber unit 102). For example, as explained in more detail below, a subscriber unit 102 that is moving away from the active incident may be suspicious and suggest that the unit 102 has been stolen/compromised. At block 305, the electronic processor 205 determines if the score exceeds a predetermined threshold. At block 306, the electronic processor 205 disables the subscriber unit 102 when the score of the subscriber unit 102 exceeds a predetermined threshold, such that the subscriber unit 102 is no longer able to communicate over the communication network 104. In other words, the subscriber unit 102 is "stunned" or "killed" via a stun or kill signal from itself or another subscriber unit 102. When the score fails to exceed the predetermined threshold, the electronic processor 205 repeats blocks 302, 304, and 305. In some embodiments, the electronic processor 205 may perform a different kind of examination each time blocks 302, 304, and 305 are repeated. In some embodiments, the electronic processor 205 performs more than one examination concurrently.

Figure 4:
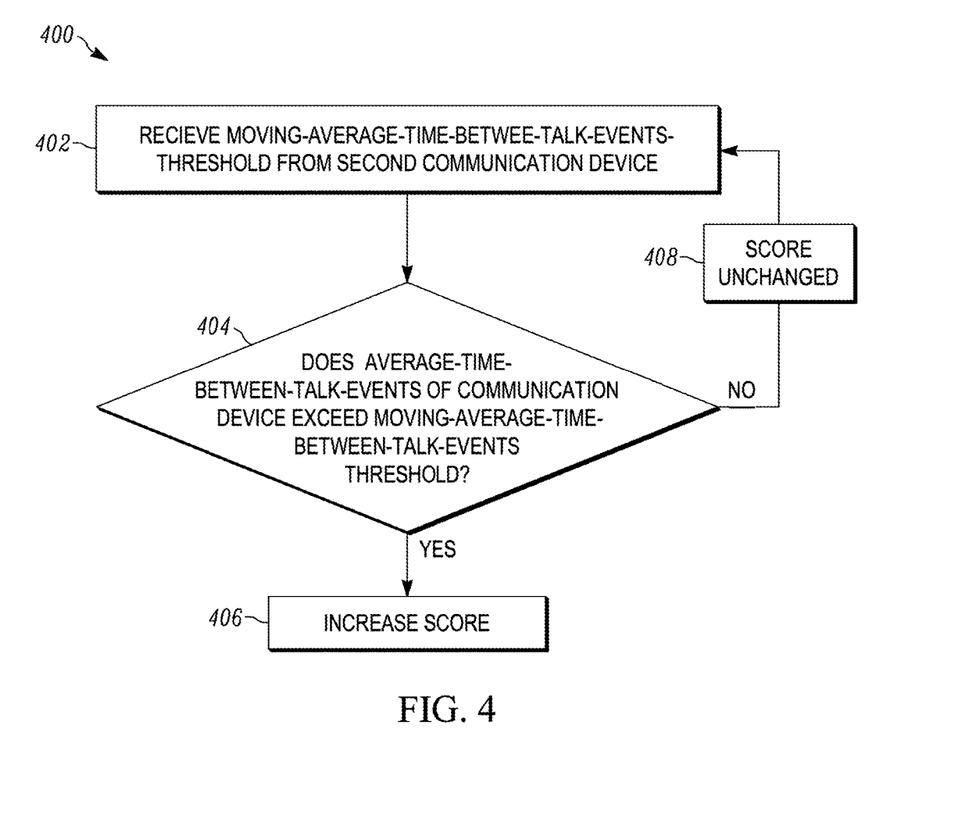
FIG. 4 is a flowchart of a method for evaluating q time between talk events of a subscriber unit of the system of FIG. 1 in accordance with some embodiments.
Figure 5:
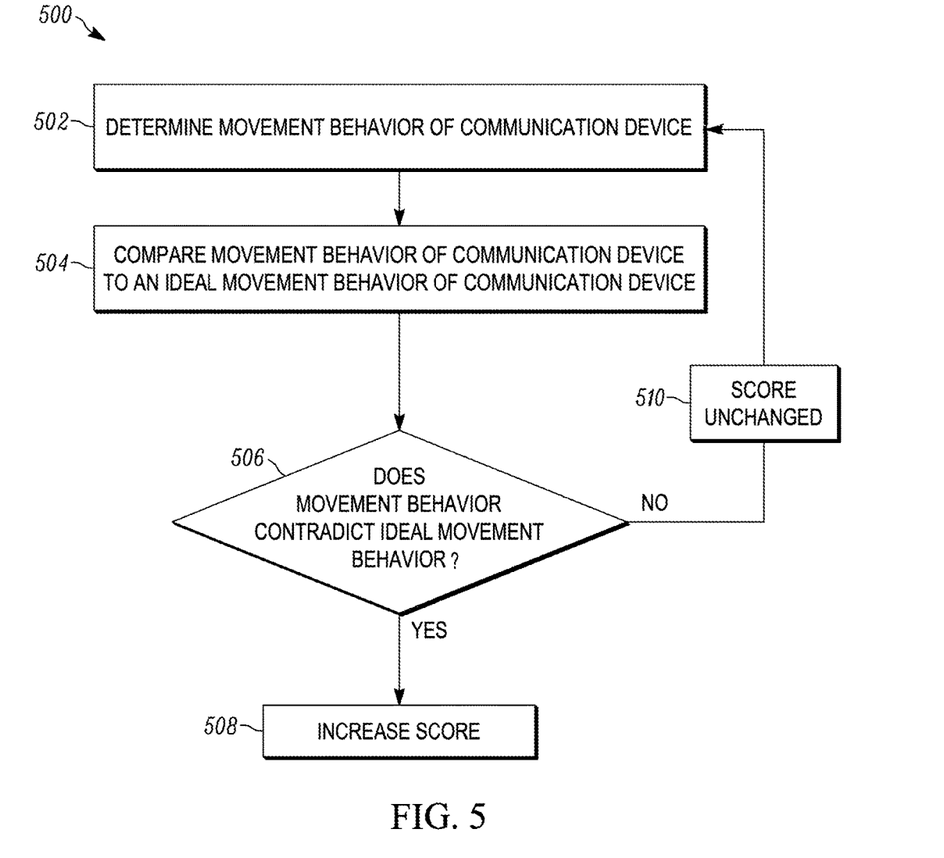
FIG. 5 is a flowchart of a method for evaluating a movement behavior of a subscriber unit of the system of FIG. 1 in accordance with some embodiments.
Figure 6:
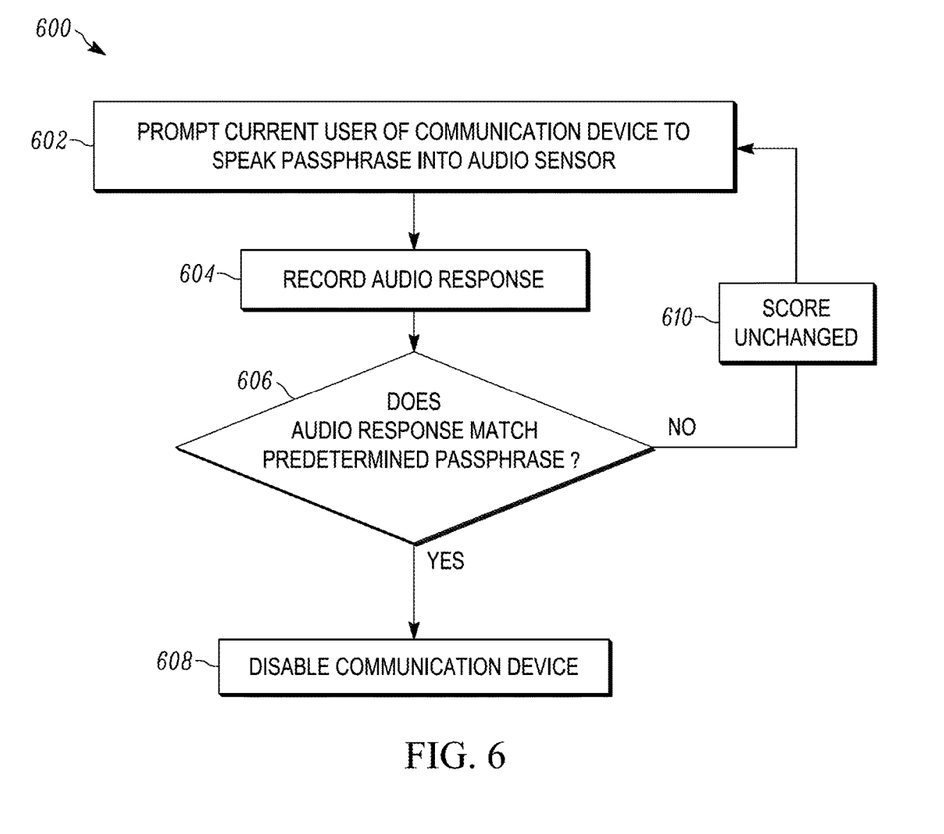
FIG. 6 is a flowchart of a method for evaluating an audio response of a subscriber unit of the system of FIG. 1 in accordance with some embodiments.

FIGS. 4 and 5 each illustrate a self-examination method 400 for evaluating the behavior of a subscriber unit 102 while FIG. 6 illustrates a group-examination method 600. The methods 400, 500, and 600 may be the one or more examination(s) performed at block 302 of method 300 (FIG. 3).

A user that has stolen the subscriber unit 102A may avoid communicating over the subscriber unit 102A with the other units 102 within the talkgroup to evade suspicion. As a consequence, the period of time between talk events (for example, the time between activations of the push-to-talk switch 218) may indicate that the subscriber unit 102 has been stolen. The method 400 illustrated in FIG. 4 is directed to a self-examination method that evaluates the time between talk events of a subscriber unit 102.

At block 402, the electronic processor 205 receives, via the transceiver 225, a timing threshold, for example, an average-time-between-talk-events threshold, from a second subscriber unit of the talkgroup 106. In one example, the average-time-between-talk-events threshold is a rolling or moving average of time between PTT events for a subscriber unit 102 within the talkgroup 106. The average-time-between-talk-events threshold may be an individual average of a subscriber unit 102 or a group average of the talkgroup 106. In some embodiments, the average-time-between-talk-events threshold is a maximum average of another subscriber unit 102 or of the talkgroup 106. In further embodiments, the average-time-between-talk-events threshold may be a previous or historical-average-time-between-talk-events threshold.

At block 404, the electronic processor 205 determines if the average-time-between-talk-events of the subscriber unit 102A exceeds the average-time-between-talk-events threshold. When the average-time-between-talk-events of the subscriber unit 102A exceeds the average-time-between-talk-events threshold, the score of the subscriber unit 102A is increased (block 406). When the average-time-between-talk-events of the subscriber unit 102A fails to exceed the average-time-between-talk-events threshold, the score of the subscriber unit 102A is maintained (or, in some embodiments, decreased) at block 408.

As mentioned previously, a user that has stolen a subscriber unit 102 may move away from (or remain a distance from) the active incident scene whereas the emergency personnel of the talkgroup 106 would move towards the scene. As a consequence, the movement behavior of the subscriber unit 102 may indicate that the subscriber unit 102 has been stolen. Accordingly, the method 500 illustrated in FIG. 5 is directed to a self-examination method that evaluates the movement behavior of the subscriber unit 102.

At block 502, the electronic processor 205 determines a movement behavior/pattern of the subscriber unit 102. The movement behavior may be determined based on information from the GNSS 235 and INS 240. The movement behavior may be a movement relative to the active incident scene location (for example, whether the subscriber unit 102 is moving towards or away from the scene or is remaining stationary). The electronic processor 205 may be further configured to evaluate a general motion of the subscriber unit. For example, the electronic processor 205 may be configured to recognize (for example, via machine learning) that the subscriber unit 102A is moving in a particular pattern (i.e., back and forth, in a circle, etc.) while not actually moving any closer to the incident scene.

At block 504, the electronic processor 205 compares the movement behavior of the subscriber unit 102A to an ideal movement behavior. The ideal movement behavior may be one or more of a predetermined movement behavior such as the movements described above (for example, moving towards the active incident scene). In some embodiments, the ideal movement behavior may be a historic movement pattern of the subscriber unit 102A. In further embodiments, the electronic processor 205 is configured to receive, from another subscriber unit 102 of the talkgroup 106, a movement pattern of the other subscriber unit 102 and use the movement pattern of the other subscriber unit 102 as the ideal movement behavior. At block 506, the electronic processor 205 determines if the movement behavior of the subscriber unit 102A contradicts the ideal movement behavior (for example, the direction of the subscriber unit 102A deviates from the ideal direction by a predetermined percentage). When the movement behavior contradicts the ideal movement behavior, the score of the subscriber unit 102A is increased (block 508). When the movement behavior does not contradict the ideal movement behavior, the score of the subscriber unit 102A is maintained (or, in some embodiments, decreased) at block 510.

In some embodiments, the examination method 500 is a group-examination, where the method 500 is performed by one or more other subscriber units 102 of the talkgroup 106. In other words, another subscriber unit 102 determines the movement behavior of the subscriber unit 102A and compares the movement behavior of the subscriber unit 102A to the ideal movement behavior.

Another example of a group-examination is illustrated in FIG. 6. The examination method 600 is a group-examination that evaluates audio from the microphone of the subscriber unit 102A. Since the audio is expected to include voice information, the examination method 600 may be considered a voice test. At block 602, the electronic processor 205 prompts the current user of the subscriber unit to speak a phrase into the microphone. The prompt may be an audible request from the speaker of the subscriber unit 102A or a visual prompt displayed on the display of the subscriber unit 102A. At block 604, the electronic processor 205 records, via the microphone, an audio response from the current user.

When the method 600 is performed as a group-examination, the electronic processor 205 transmits the audio response to one or more of the other subscriber units 102 of the talkgroup 106, for example, as a PTT broadcast. In such embodiments, the other subscriber units 102 may prompt their user(s) asking if the audio response matches the passphrase (in particular, if the voice in the audio is recognizable as the user the subscriber unit 102A is assigned to). The subscriber unit 102A may then receive, from the one or more subscriber units 102, a notification/answer to the prompt. When a majority of the received notifications indicate that the audio response does not match the predetermined passphrase, the score of the subscriber unit 102A is increased. In some embodiments, when the audio response is determined not to match the predetermined passphrase, the score of the subscriber unit 102A may be increased such that the score exceeds the predetermined threshold (block 305 of method 300 of FIG. 3) and the subscriber unit 102A is disabled (block 608). When the audio response does match the predetermined passphrase, the score of the subscriber unit 102A is maintained (or, in some embodiments, decreased) at block 610.

In some embodiments, the examination method 600 is performed when the score of the subscriber unit exceeds an initial threshold that comes before the predetermined threshold of block 305 of the method 300 above. In some embodiments, the method 600 is performed as a self-examination. In such embodiments, at block 606, the predetermined passphrase may be a previously recorded sample from a known user of the subscriber unit 102A and the electronic processor 205 may be configured to utilize voice recognition and/or similar audio analytics to determine if the audio response matches the predetermined passphrase. In some embodiments, the electronic processor 205 is configured to store a voice profile of the last user of the subscriber unit 102A and compare the audio response to the predetermined passphrase based on the stored voice profile. In further embodiments, more than one voice profile of more than one user is stored and compared to the audio response.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device for use with a communication network that includes a second communication device, the communication device comprising:
an electronic processor configured to:
perform an examination of a behavior of the communication device, the examination including determining and evaluating an average-time-between-talk events of the communication device;
determine, based on a result of the examination, a score of the communication device, the score indicating abnormal behavior of the communication device; and
disable, in response to the score exceeding a predetermined threshold, the communication device via a stun or kill command,
wherein the electronic processor is further configured to
determine whether the average-time-between-talk-events of the communication device exceeds an historical-average-time-between-talk-events threshold,
increase the score of the communication device in response to the average-time-between-talk-events of the communication device exceeding the historical-average-time-between-talk-events threshold.

2. The communication device of claim 1, wherein the examination of a behavior includes at least one selected from the group consisting of a self-examination and a group-examination.

3. The communication device of claim 2, wherein the communication device includes a transceiver configured to transmit and receive data over the communication network and wherein the electronic processor is further configured to perform the self-examination by
receiving, via the transceiver, an average-time-between-talk-events threshold from the second communication device,
determining whether the average-time-between-talk-events of the communication device exceeds the average-time-between-talk-events threshold,
wherein the score of the communication device is increased in response to the average-time-between-talk-events of the communication device exceeding the average-time-between-talk-events threshold.

4. The communication device of claim 2, wherein the electronic processor is further configured to perform the self-examination by
determining a movement behavior of the communication device; and
comparing the movement behavior of the communication device to an ideal movement behavior of the communication device,
wherein the score of the communication device is increased in response to the movement behavior contradicting the ideal movement behavior.

5. The communication device of claim 2, wherein the communication device includes a transceiver configured to transmit and receive data over the communication network and wherein the electronic processor is further configured to perform the group-examination by
transmitting, via the transceiver, a movement behavior of the communication device to the second communication device when the score of the communication device exceeds an initial threshold, and
increasing the score of the communication device in response to the communication device receiving, from the second communication device, a notification that the movement behavior contradicts an ideal movement behavior.

6. The communication device of claim 1, wherein the electronic processor is further configured to perform a voice test by
prompting a current user of the communication device to speak a passphrase into an audio sensor of the communication device,
recording an audio response of the current user,
determining whether the audio response matches a predetermined passphrase, and
disabling, when the audio response does not match the predetermined passphrase, the communication device.

7. The communication device of claim 6, wherein the communication device further includes a transceiver configured to transmit and receive data over the communication network and wherein the electronic processor is further configured to transmit, via the transceiver, the audio response to the second communication device and
disable the communication device in response to receiving, via the transceiver, from the second communication device, a notification that the audio response does not match the predetermined passphrase.

8. The communication device of claim 1, wherein the communication network does not include a central server.

9. A method for disabling a communication device of a communication network that includes a second communication device, the method comprising:
performing an examination of a behavior of the communication device, the examination including determining and evaluating an average-time-between-talk events of the communication device;
determining, based on a result of the examination of a behavior of the communication device, a score of the communication device, the score indicating abnormal behavior of the communication device;
disabling, in response to the score exceeding a predetermined threshold, the communication device via a stun or kill command,
determining if the average-time-between-talk-events of the communication device exceeds an historical-average-time-between-talk-events threshold, and
increasing the score of the communication device in response to the average-time-between-talk-events of the communication device exceeding the historical-average-time-between-talk-events threshold.

10. The method of claim 9, wherein the examination of a behavior including at least one selected from the group consisting of a self-examination and a group-examination.

11. The method of claim 10, wherein the self-examination includes
receiving, via a transceiver of the communication device, an average-time-between-talk-events threshold from the second communication device,
determining whether the average-time-between-talk-events of the communication device exceeds the average-time-between-talk-events threshold,
wherein the score of the communication device is increased in response to the average-time-between-talk-events of the communication device exceeding the average-time-between-talk-events threshold.

12. The method of claim 10, wherein the self-examination includes
determining a movement behavior of the communication device;
comparing the movement behavior of the communication device to an ideal movement behavior of the communication device; and
wherein the score of the communication device is increased in response to the movement behavior contradicting the ideal movement behavior.

13. The method of claim 10, wherein the group-examination includes
transmitting, via a transceiver of the communication device, a movement behavior of the communication device to the second communication device when the score of the communication device exceeds an initial threshold, and
increasing the score of the communication device in response to receiving, from the second communication device, a notification that the movement behavior contradicts an ideal movement behavior.

14. The method of claim 10, wherein the method further includes performing a voice test, the voice test including:
prompting a current user of the communication device to speak a passphrase into an audio sensor of the communication device;
recording an audio response of the current user;
determining whether the audio response matches a predetermined passphrase; and
disabling, when the audio response does not match the predetermined passphrase, the communication device.

15. The method of claim 14, wherein the method further includes:
    transmitting the audio response to a second communication device of the communication network; and
    disabling the communication device in response to receiving, from the second communication device, a notification that the audio response does not match the predetermined passphrase.

16. The method of claim 9, wherein the communication network does not include a central server.

17. A communication device for use with a communication network that includes a second communication device, the communication device comprising:
    an electronic processor configured to:
        perform an examination of a behavior of the communication device;
        determine, based on a result of the examination, a score of the communication device; and
        disable, in response to the score exceeding a predetermined threshold, the communication device;
    wherein the examination includes
        receiving, via a transceiver, an average-time-between-talk-events threshold from the second communication device and determining whether an average-time-between-talk-events of the communication device exceeds the average-time-between-talk-events threshold,
        wherein the score of the communication device is increased in response to the average-time-between-talk-events of the communication device exceeding the average-time-between-talk-events threshold.

18. A method for disabling a communication device of a communication network that includes a second communication device, the method comprising:
    performing an examination of a behavior of the communication device, the examination including determining and evaluating an average-time-between-talk events of the communication device;
    determining, based on a result of the examination of a behavior of the communication device, a score of the communication device, the score indicating abnormal behavior of the communication device; and
    disabling, in response to the score exceeding a predetermined threshold, the communication device via a stun or kill command
    wherein the examination includes
        receiving, via a transceiver, an average-time-between-talk-events threshold from the second communication device and determining whether an average-time-between-talk-events of the communication device exceeds the average-time-between-talk-events threshold, wherein the score of the communication device is increased in response to the average-time-between-talk-events of the communication device exceeding the average-time-between-talk-events threshold.

* * * * *